(12) United States Patent
Humbach et al.

(10) Patent No.: US 11,054,567 B2
(45) Date of Patent: Jul. 6, 2021

(54) DECORATIVE LIGHT GUIDE ELEMENT

(71) Applicant: Temicon GmbH, Dortmund (DE)

(72) Inventors: Oliver Humbach, Dortmund (DE); Mike Bülters, Dortmund (DE)

(73) Assignee: Temicon GmbH, Dortmund (DE)

( * ) Notice: Subject to any disclaimer, the term of this patent is extended or adjusted under 35 U.S.C. 154(b) by 0 days.

(21) Appl. No.: 16/617,061

(22) PCT Filed: May 30, 2018

(86) PCT No.: PCT/EP2018/064204
§ 371 (c)(1),
(2) Date: Nov. 26, 2019

(87) PCT Pub. No.: WO2018/220025
PCT Pub. Date: Dec. 6, 2018

(65) Prior Publication Data
US 2021/0055467 A1 Feb. 25, 2021

(30) Foreign Application Priority Data
May 30, 2017 (DE) ...................... 10 2017 111 763.6

(51) Int. Cl.
*F21V 8/00* (2006.01)

(52) U.S. Cl.
CPC ......... *G02B 6/0036* (2013.01); *G02B 6/0065* (2013.01)

(58) Field of Classification Search
None
See application file for complete search history.

(56) References Cited

U.S. PATENT DOCUMENTS

2016/0062022 A1   3/2016   Wimmer

FOREIGN PATENT DOCUMENTS

| DE | 102013021600 A1 | 8/2014 |
| DE | 102014112470 A1 | 3/2016 |
| DE | 102015016719 A1 | 7/2016 |
| WO | WO 2007/115736 A1 | 10/2007 |
| WO | WO 2013/030042 A1 | 3/2013 |

OTHER PUBLICATIONS

International Search Report for Application No. PCT/EP2018/064204, with English translation, dated Sep. 7, 2018 (5 pages).
Written Opinion of International Searching Authority for Application No. PCT/EP2018/064204, with English translation, dated Sep. 7, 2018 (9 pages).

*Primary Examiner* — Vip Patel
(74) *Attorney, Agent, or Firm* — Nixon Peabody LLP

(57) ABSTRACT

A decorative light guide element having a decorative surface made of segments, at least one of which is a decorative light guide element, and method for producing such a decorative light guide element with illumination and decorative functions. To provide a decorative light guide element, which facilitates illumination independent of the decoration but also has visible decoration when deactivated, provision is made for the decorative light guide element to have a planar light guide element and a light source for coupling light into the light guide element. On a first side of the light guide element, a planar decorative element and, on the opposite side, a microstructure layer for coupling out the light of the light guide element are arranged. An intermediate layer is arranged between the light guide and decorative elements. The intermediate layer having a lower refractive index than the material of the light guide element.

14 Claims, 3 Drawing Sheets

DECORATIVE LIGHT GUIDE ELEMENT

CROSS-REFERENCE TO RELATED APPLICATIONS

Figure 1:
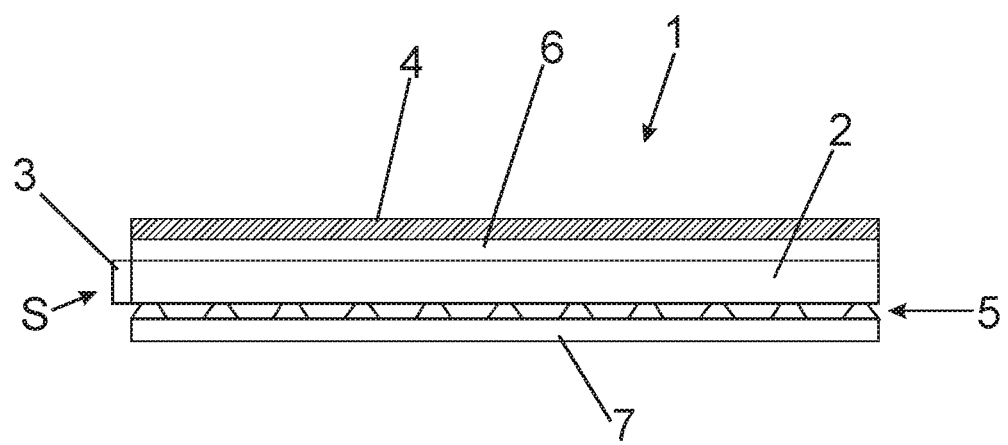

This application is a U.S. National Stage of International Application No. PCT/EP2018/064204, filed May 30, 2018, which claims the benefit of Germany Patent Application No. 10 2017 111 763.6, filed May 30, 2017, both of which are incorporated herein by reference in their entireties.

The invention relates to a decorative light guide element, to a method for producing a decorative light guide element comprising an illumination function and a decorative function, and to a decorative surface made of a plurality of segments, at least one of the segments being a decorative light guide element.

Decorative light guide elements are known in a variety of designs from the prior art and are in particular intended for planar illumination and for decorative purposes. To this end, the decorative light guide elements can comprise a colored or multi-colored illumination or an illuminated decorative layer.

In the decorative light guide elements of the prior art, a decoration is often illuminated by means of a light guide element, such that the decoration can be seen to be illuminated or backlit in the activated state of the decorative light guide element and the decoration can be seen to be unlit in the deactivated state.

Moreover, there are decorative light guide elements which have no visible decoration in the deactivated state, but rather a matte, non-transparent covering on the surface, for example, as a result of which said decorative light guide elements are perceived to be visually unappealing and potentially even bothersome in the deactivated state.

The existing decorative light guide elements comprise light outcoupling, which is influenced in terms of color, brightness or light distribution by means of the decoration. Furthermore, all decorative light guide elements of the prior art do not enable any alternative, mutually independent use of an illumination function and decorative function, since either the decoration is always visible, both in the activated and deactivated state of the decorative light guide element, or no decoration is visible in the deactivated state, and thus the decorative light guide element is visually unappealing.

The object of the invention is therefore to provide a decorative light guide element which on the one hand enables illumination independent of the decoration, on the other hand, however, has a visible decoration in the deactivated state, the brightness, color and light distribution of the outcoupled light not being influenced by the decoration.

This object is solved according to the invention by a decorative light guide element according to claim 1, by a decorative surface according to claim 13 and by a method according to claim 14 for producing a decorative light guide element. Advantageous further embodiments of the invention are given in the dependent claims.

The decorative light guide element according to the invention comprises a planar light guide element and a light source for coupling light into the light guide element, a planar decorative element being arranged on a first side of the light guide element and a microstructure layer for coupling the light out of the light guide element being arranged on the opposite side of the light guide element, an intermediate layer being arranged between the light guide element and the decorative element, said intermediate layer having a lower refractive index than the material of the light guide element.

The arrangement of a microstructuring on only one side of the light guide advantageously makes it possible for the decorative light guide element to be self-illuminating and to merely be perceived as bright when the light source is activated. The light beams emitted from the decorative light guide element thereby do not come into contact with the decorative element and are in particular not reflected thereon, such that the light color, light intensity and light guidance are not influenced by the decorative layer in the activated state of the light source. In contrast, in the deactivated state of the light source, the decorative element located behind the light guide element is visible in a clear and colorfast manner. By means of the invention, a surface comprising an illumination function and a decorative function is therefore provided, it being possible to use both functions as an alternative to one another and independently of one another. Furthermore, the light is coupled out through the intermediate layer and through the microstructure layer with a defined light distribution, the outcoupled light not coming into contact with the decorative element.

Furthermore, the invention relates to a decorative surface made of a plurality of segments that preferably each comprise one decorative layer, at least one of the segments being a decorative light guide element according to the invention and the decorative surface preferably comprising both segments comprising a light function and segments not comprising light integration. Further preferably, all segments form an extensive decorative surface in which, particularly preferably, only some of the segments fulfill light functions or respectively are luminous. However, in principle, it is also conceivable for all segments of the decorative surface to be designed as decorative light guide elements.

Finally, the invention relates to a method for producing a decorative light guide element comprising arranging a light guide element comprising a light source for light incoupling opposite a decorative element and arranging or respectively producing a microstructure layer for light outcoupling on the side of the light guide element that is opposite the decorative element, the light guide element being arranged opposite the decorative element such that, in the activated state of the light source, the light is coupled out of the light guide element so as to be unaffected by the decorative element, and such that, in the deactivated state of the light source, a surface comprising a decoration of the decorative element becomes visible through the light guide element.

A decorative light guide element according to the invention should in principle be understood to mean any device which can emit light via at least one surface and in which a decoration in the region of the light-emitting surface becomes visible when the light is deactivated, which decoration is not detectable in the light-emitting state or respectively does not influence the properties of the emitted light. Preferably, the light-emitting surface is a planar or uniformly curved, particularly preferably completely even, surface of the decorative light guide element.

The light guide element, the decorative element and/or the microstructure layer can each be designed as a plate, film or layer. Preferably, the light guide element, the decorative element and/or the microstructure layer extend over the entire surface of the decorative light guide element. Particularly preferably, the decorative element and/or the light guide element and/or the microstructure layer comprise an identical surface and/or are arranged one above the other in a congruent manner. It is further preferable for the light guide element, the decorative element and/or the microstructure layer to be integrally formed.

Furthermore, the microstructure layer may also be applied in accordance with a planar layout that is preferably not detectable in the deactivated state and becomes visible in the activated state, since only said layout lights up. In this way, the decorative light guide element can contribute to the decoration both in the deactivated and in the activated state, since in one state the decoration is visible and in the other state the layout of the microstructure for light outcoupling is visible. The layout may thereby extend over the entire surface of the light guide in a uniform manner and/or in repeating units. Alternatively, the layout may only be arranged on part of the surface of the light guide in any desired form. It is thereby conceivable to show characters, numbers, patterns, figures, images, photos and/or geometric figures.

The decorative element comprises a decoration at least on the side facing the light guide element. The decoration may involve surface struct and/or coloring of the surface of the decorative element. The coloring may be produced in any desired way, for example by means of printing or another form of color application. However, the decoration may also be produced by assembling different materials or materials of different colors. The decorative element may in particular comprise a dark surface, for example a black or anthracite-colored surface, and/or a rough or diffuse surface structure. The decorative element may be a metal part, in particular having a brushed surface, or it may be a component made of plastics material or wood.

According to the invention, the microstructure layer for coupling out light is provided on only one side of the light guide, with no light outcoupling taking place on the side of the light guide element facing the decorative element. Preferably, no outcoupling structure, and in particular no microstructure layer, is arranged on the surface of the light guide element facing the decorative element or respectively intermediate layer, i.e., said surface is designed to be microstructure-free, such that, particularly preferably, a defined, one-sided light outcoupling occurs on or respectively at the light guide element by means of exactly one microstructure layer. The microstructure layer is preferably arranged directly on the light guide element or integrally formed with the light guide element. Particularly preferably, the microstructure layer is made of the same material as the light guide element.

According to the invention, an intermediate layer is arranged between the light guide element and the decorative element, which intermediate layer has a lower refractive index than the material of the light guide element, as a result of which it is ensured in a particularly simple manner that the decoration of the decorative element is not visible in the activated state of the light source. The intermediate layer thereby preferably extends over the entire surface of the decorative light guide element or respectively separates the decorative element entirely from the light guide element. The intermediate layer is, most preferably, an LRI layer (LRI=low refractive index) or respectively a layer having a lower refractive index than the refractive index of the light guide element. Preferably, the intermediate layer bears against the surface of the decorative element and/or light guide directly and/or in a planar manner.

According to a preferred embodiment of the decorative light guide element according to the invention, the light source comprises at least one, preferably a plurality of LEDs and is, particularly preferably, exclusively formed of LEDs, as a result of which cost-effective production and long-lasting and energy-saving operation is ensured in a particularly simple manner. Alternatively, it is conceivable for the light source to be exactly one LED.

In an advantageous further embodiment of the decorative light guide element according to the invention, the light is coupled into the light guide element by means of the light source on at least one side of the light guide element that is preferably arranged at an angle, particularly preferably at a right angle, with respect to the decorative element or respectively the decorative surface thereof. Most preferably, the incoupling occurs by means of the arrangement of the light source directly on only one single side of the light guide element, incoupling also being possible in principle from a plurality of sides and/or at multiple points on one side at the same time.

In an advantageous development of the decorative light guide element according to the invention, the intermediate layer is formed of a hollow space that is filled with air at least in part or fully, an air cavity layer, a gas-filled, in particular air-filled gap, or alternatively also a vacuum layer.

In an embodiment of this kind, it is further preferable if spacers are arranged between the light guide element and the decorative element, in order to keep the distance between both elements constant. Preferably, said spacers are distributed evenly over the surface of the decorative light guide element and/or are at a consistent distance from one another. Particularly preferably, the spacers are designed as a microstructure and most preferably comprise an almost puncti-form contact to the light guide element. The contacts are thereby preferably designed to be such small, that they are not visible to the eye. Preferably, the contact is smaller than 100 µm, preferably smaller than 1 µm, most preferably smaller than 500 nm and particularly preferably smaller than 200 nm. The contact surfaces of all spacers preferably make up less than 5%, particularly preferably less than 2% and most preferably less than 1% of the light guide surface pointing toward the decorative element. In an equally preferable manner, the material of the spacers has a lower refractive index than the material of the light guide element, in order to prevent illumination of the decorative element via the spacers. As a preferable alternative, the intermediate layer may also comprise a microstructure having air cavities and is particularly preferably formed thereof.

Also advantageous is an embodiment of the decorative light guide element in which the width of the intermediate layer between the light guide element and the decorative element is between 100 nm and 500 µm, preferably between 500 nm and 200 µm, and particularly preferably between 1 µm and 100 µm, as a result of which embodiment on the one hand a compact construction of the decorative light guide element is ensured and on the other hand illumination of the decorative element by means of the light guide element is effectively prevented, such that the surface of the decorative element is not visible in the activated state.

In a preferred embodiment of the decorative light guide element according to the invention, a planar cover layer is arranged on the microstructure layer on the side facing away from the light guide element, which cover layer protects the microstructure layer from damage and dirt. The cover layer may in principle be designed as a plate, film or layer and/or it may be integrally formed. Particularly preferably, the cover layer has an identical refractive index to the light guide element and/or the microstructure layer. Most preferably, the cover layer and the light guide element and/or the microstructure layer are made of the same material.

In a particularly preferred embodiment of the decorative light guide element according to the invention, the light guide element, the microstructure layer, the intermediate layer and/or the cover layer are transparent, in particular highly transparent, as a result of which the decorative element or respectively the decoration thereof are clearly visible through the light guide element, the microstructure layer, the intermediate layer and/or the cover layer when the light source is deactivated. Particularly preferably, all components of the decorative light guide element are highly transparent, with the exception of the decorative element.

A material is understood to be highly transparent if it transmits the light without altering it in a manner detectable to an observer, in particular without dimming and/or reducing the intensity thereof, or respectively if it is correspondingly permeable to light. Transparency hereby applies at least to all wavelengths emitted by the light source and/or within the visible spectrum between 380 nm and 780 nm. Transparency is hereby understood to mean a permeability to incident light of at least 50%, preferably at least 75% and particularly preferably at least 85%. Accordingly, a material is highly transparent if at least 90%, preferably at least 95% and particularly preferably at least 97% of the incident light is allowed to pass through.

It is preferable, in particular, if the microstructuring for light outcoupling is also designed such that it has no visible effect on the transparency of the microstructure layer. It is further preferable for the light guide element, the microstructure layer, the intermediate layer and/or the cover layer to be designed such that a light beam can pass through in an unaltered manner, in particular with regard to the angle thereof, it being particularly preferable if no visible or respectively perceivable focusing, scattering, distortion or other change to the beam path takes place. Finally, the microstructuring is designed such that there are no interferences with the incident or outcoupled light, in particular within the visible wavelength range.

According to an advantageous further embodiment of the decorative light guide element according to the invention, the microstructure layer is made of microstructures arranged uniformly on a surface of the light guide element. The microstructures thereby preferably project from the surface of light guide element. The microstructures may be integrally formed with the light guide element and be connected thereto, in particular glued thereto. Alternatively, the microstructure layer or respectively the microstructure of the microstructure layer may also be applied randomly or with a defined distribution.

According to a particularly preferred embodiment of the decorative light guide element according to the invention, the microstructure layer is designed such that a microstructure is laid on or applied to a surface of the decorative element, as a result of which the intermediate layer is subsequently formed in the contact between the decorative element and the light guide element, which intermediate layer is preferably composed of air-filled chambers. Accordingly, the intermediate layer may be formed of a surface structuring of the decorative element, the surface structuring acting as a spacer.

Preferably, the microstructures are each designed as indented structures which are particularly preferably identical to one another and thereby have the same shape, size, height, width and/or length. Particularly preferably, the microstructures are designed to be parabolic, cylindrical, conical or trapezoid, in particular trapezoidal prisms. Both the smaller and the larger surface of the microstructures may thereby be arranged on the surface of the light guide element. Preferably, the smaller surface of the microstructures is arranged on the surface of the light guide such that an indented structure for coupling light out of the light guide element is produced.

It is further preferable for the decorative light guide element to comprise a mirror layer, the decorative element particularly preferably being designed as a mirror layer, such that an observer can be reflected in the decorative light guide element when the light source is deactivated. Here the mirror-coated side of a decorative element designed as a mirror layer is preferably oriented toward the light guide element.

According to a preferred further embodiment of the decorative light guide element according to the invention, the light guide element, the intermediate layer and/or the cover layer comprise at least one antireflection-coated surface and particularly preferably both surfaces of the light guide element, the intermediate layer and/or the cover layer are antireflection-coated within the layer structure of the decorative light guide element and/or on the surface thereof, as a result of which the decorative element can be rendered particularly clearly visible.

Figure 2:
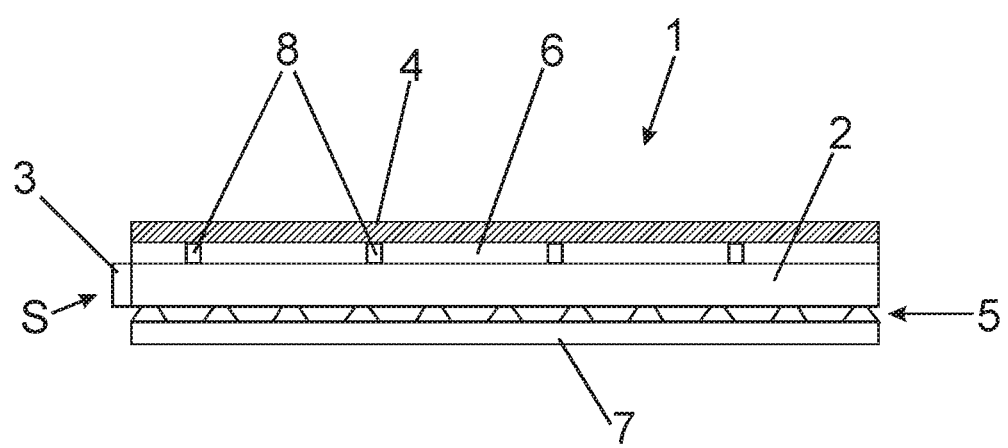
Figure 3:
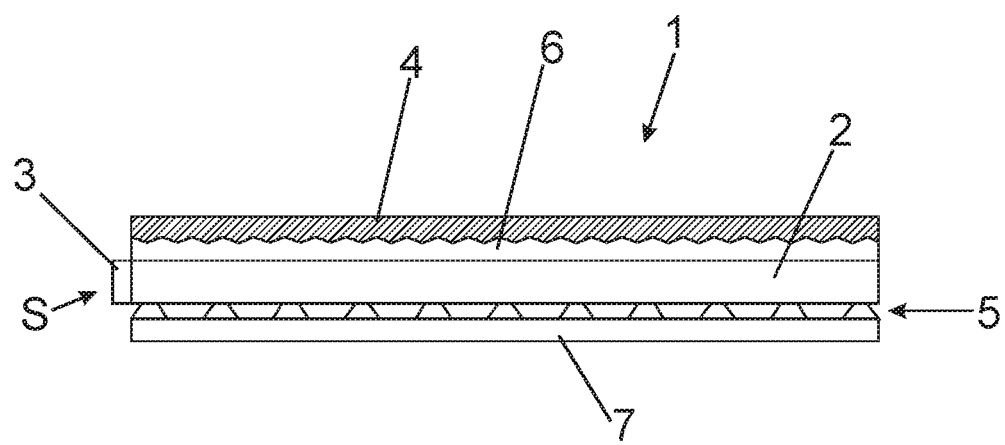

Several exemplary embodiments of a decorative light guide element according to the invention will be explained in more detail in the following with reference to the drawing, in which:

FIG. 1 shows a schematic view of the structure of a first embodiment of a decorative light guide element having a solid intermediate layer, FIG. 2 shows a schematic view of the structure of a second embodiment of a decorative light guide element having a gas-filled intermediate layer, and FIG. 3 shows a schematic view of the structure of a third embodiment of a decorative light guide element having a decorative element having a structured surface.

In a decorative light guide element 1 shown in FIG. 1, an LED light source 3 is arranged on one side S of a transparent light guide element 2, by means of which light source light can be coupled into the light guide element 2.

The light guide element 2 is arranged so as to be spaced apart from and at the same time in parallel with a decorative element 4 by means of an intermediate layer 6. The light guide element 2, the decorative element 4 and the intermediate layer 6 are designed as planar, integral elements, the intermediate layer 6 being made of a solid material having a lower refractive index than the material of the light guide element 2. The decorative element 4 comprises a colored surface that faces the light guide element 2.

A microstructure layer 5 is arranged directly on the surface of the light guide element 2 on the side of the light guide element 2 opposite the decorative element 4. The microstructure layer 5 is made of the same material as the light guide element 2 and comprises microstructures that are evenly distributed over the surface of the light guide element 2 and that have the shape of a trapezium in the direction of the light outcoupling out of the light guide element 2, the smaller surface of the trapezium being in direct contact with the surface of the light guide element 2. In this way, an indented structure for coupling out light is created by the microstructure elements in conjunction with the light guide element 2.

A cover layer 7 for protecting the microstructures is arranged directly on the surface of the microstructure layer 5 on the side facing away from the light guide element 2, the microstructure layer 5 and the cover layer 7 also being designed to be transparent, such that, when a light source 3 is deactivated, the decorative element 4 is unaffectedly and unrestrictedly visible through the remaining layers of the decorative light guide element 1.

In contrast, when the light source 3 is activated, the surface of the decorative element 4 comprising a decoration is not visible, since the light coupled out of the light guide element 2 does not illuminate the decorative element 4 and is merely emitted in the opposite direction toward an observer. Accordingly, the intensity and color of the light emitted from the decorative light guide element 1 is not influenced by the decorative element 4. This is entirely non-dependent on the color, structure, in particular surface structure, and the material of the decorative element 4, and therefore any desired decorative element 4 can be used.

The decorative light guide element 1 shown in FIG. 2 differs from the embodiment shown in FIG. 1 in that the intermediate layer 6 is designed as an air gap, spacers 8 being arranged at regular distances between the light guide element 2 and the decorative element 4, which spacers keep the light guide element 2 and the decorative element 4 at a consistent distance from one another. The spacers 8 thereby comprise a punctiform contact surface with the light guide element 2.

In the decorative light guide element 1 shown in FIG. 3, the decorative element 4 has a distinct structuring on the surface facing the light guide element 2 that is clearly visible in the non-illuminated state of the decorative light guide element 1. Apart from that, this decorative light guide element 1 corresponds to the embodiment shown in FIG. 1.

LIST OF REFERENCE SIGNS

1 Decorative light guide element
2 Light guide element
3 Light source
4 Decorative element
5 Microstructure layer
6 Intermediate layer
7 Cover layer
8 Spacers
S Side of the light guide element

The invention claimed is:

1. A decorative light guide element, comprising:
a planar light guide element,
a light source for coupling light into the light guide element, wherein
a planar decorative element is arranged on a first side of the light guide element and
a microstructure layer for coupling light out of the light guide element is arranged on the opposite side of the light guide element, as a result of which the light guide element does not illuminate the decorative element, wherein
the microstructures of the microstructure layer are designed as indented structures, which project from the surface of the light guide element, and wherein
an intermediate layer is arranged between the light guide element and the decorative element, which intermediate layer has a lower refractive index than the material of the light guide element in order to prevent outcoupling of light.

2. The decorative light guide element according to claim 1, wherein the intermediate layer is formed of a hollow space that is partially or fully filled with air.

3. The decorative light guide element according to claim 1, wherein the width of the intermediate layer between the light guide element and the decorative element is less than 100 µm.

4. The decorative light guide element according to claim 1, wherein a planar cover layer is arranged on the microstructure layer on the side opposite the light guide element.

5. The decorative light guide element according to claim 1, wherein the light guide element, the microstructure layer, the intermediate layer and the cover layer are transparent.

6. The decorative light guide element according to claim 1, wherein spacers are arranged between the light guide element and the decorative element, which spacers bear against the light guide element in a punctiform manner and are preferably formed of a microstructuring applied to the surface of the decorative element.

7. The decorative light guide element according to claim 1, wherein the microstructures are designed to be lenticular, conical, parabolic, cylindrical, trapezoidal, or trapezoidal prisms.

8. The decorative light guide element according to claim 1, characterized in that the decorative element is designed as a mirror layer.

9. The decorative light guide element according to claim 1, wherein the light guide element, the intermediate layer or the cover layer includes at least one antireflection-coated surface.

10. The decorative light guide element according to claim 1, wherein a surface of the light guide element adjoining the intermediate layer is designed to be free of outcoupling structures or to be free of microstructure layers.

11. The decorative light guide element according to claim 1, wherein a microstructure is not applied in a uniform manner over the microstructure layer, but rather in accordance with a planar layout.

12. The decorative light guide element according to claim 1, wherein the decorative element is opaque and extends over the entire surface of the light guide element.

13. A decorative surface made of a plurality of segments, wherein at least one of the segments is a decorative light guide element according to claim 1.

14. A method for producing a decorative light guide element comprising an illumination function and a decorative function, said method comprising the steps of:
arranging a light guide element comprising a light source for light incoupling opposite a decorative element,
arranging or respectively producing a microstructure layer for light outcoupling on the side of the light guide element that is opposite the decorative element,
wherein the microstructures of the microstructure layer are designed as indented structures, which project from the surface of the light guide element, and
wherein the light guide element is arranged opposite the decorative element and the light is coupled out such that, in the activated state of the light source, the light is coupled out of the light guide element so as to be unaffected by the decorative element, and such that, in the deactivated state of the light source, a decorative surface of the decorative element becomes visible through the light guide element.

* * * * *